United States Patent [19]

Mac Farlane

[11] 4,077,609

[45] Mar. 7, 1978

[54] THREADING DEVICE AND METHOD OF THREADING

[75] Inventor: John Hartley Trevor Mac Farlane, Hounslow, England

[73] Assignee: The Post Office, London, England

[21] Appl. No.: 738,582

[22] Filed: Nov. 3, 1976

[30] Foreign Application Priority Data

Nov. 6, 1975 United Kingdom ............ 46043/75

[51] Int. Cl.² ............................................. B66D 1/36
[52] U.S. Cl. ......................................... 254/134.3 FT
[58] Field of Search ............... 254/134.3 R, 134.3 FT, 254/190; 15/104.3 R, 104.35 N, 104.3 G

[56] References Cited

U.S. PATENT DOCUMENTS

| 2,670,178 | 2/1954 | De Wolf | 254/134.3 |
| 2,727,721 | 12/1955 | Pinkerton | 254/134.3 R |
| 3,497,899 | 3/1970 | Caperton | 15/104.3 R |

*Primary Examiner*—Robert C. Watson

*Attorney, Agent, or Firm*—Hall & Houghton

[57] ABSTRACT

A threading device for threading a line through an upright hollow pole comprises a guiding and supporting means for the line and a substantially rigid shaft on an end of which the guiding and supporting means is mounted, the other end of the shaft being hinged to means capable of securing the shaft to a threading rod. The guiding and supporting means can comprise a block provided with passageways and having a body part and a bollard housed in a recess within the block and surrounded by passageways. When threading a pole the device is passed upwardly through the pole by means of threading rods with a weighted line held by the supporting and guiding means and, upon passing out of the pole, the shaft pivots relative to the threading rods so that the weighted end of the line hangs outside the pole. The rods can then be rotated to locate the end of the line in the desired orientation relative to the pole, and the weight then lowered.

26 Claims, 10 Drawing Figures

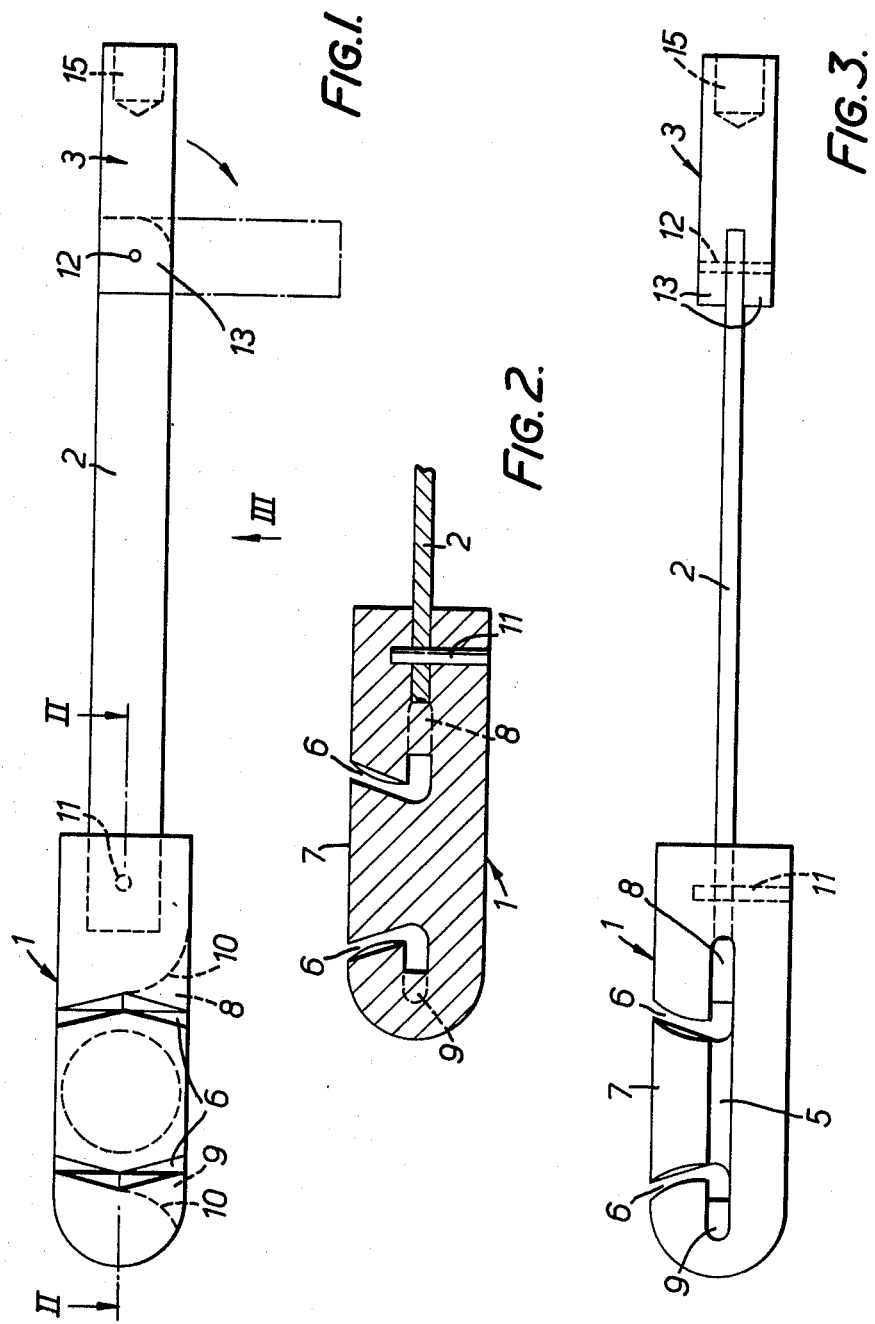

THREADING DEVICE AND METHOD OF THREADING

This invention relates to threading devices and a method of threading a line or wire through a hollow upright pole.

Conventional solid wooden telegraph poles are becoming progressively more expensive and the necessary wood for the poles is also becoming scarcer. It has therefore been proposed to use hollow telegraph poles of aluminium or plastics material in place of the wooden type. It is desirable to be able to thread a wire through such a hollow pole when it is erected and also to be able to position the wire between selected existing wires which the pole may be carrying. In the past, with solid wooden poles, the problem of threading has not arisen.

It is an object of the invention to provide a threading device suitable for this purpose.

According to the invention there is provided a threading device including a guiding and supporting means for a line and a substantially rigid shaft on an end of which the guiding and supporting means is mounted, the other end of the shaft being hinged to means capable of securing the shaft to a threading rod.

The boundary surface of the guiding and supporting means furthest from said other end of the shaft can be smoothly rounded surface.

The guiding and supporting means can be of elongate shape and mounted on the shaft with its long axis substantially collinear with the shaft.

The guiding and supporting means can comprise a block provided with passageways and having a body part and a bollard housed in a recess within the block and surrounded by passageways.

The bollard can be integrally formed with the block.

The bollard can be freely upstanding in said recess.

The upstanding end of the bollard can be flared to define retaining means for retaining a line around the bollard.

The opposite ends of the bollard can be attached to respective regions of the body part.

The body part can be formed with a slot passing through the body transverse to the shaft and the bollard can bridge the slot.

The guiding and supporting means can alternatively comprise a pulley mounted for rotation about an axis transverse to the shaft.

The hinging of the shaft to the securing means can be such that the shaft can pivot about the securing means from a position in line with a threading rod to which the device is secured through approximately a right angle to one side only.

The guiding and supporting means can be asymmetrical about the plane in which the axis of the shaft and the axis of hinging lie.

The guiding and supporting means can be made of a material selected from the group of metal, wood and plastics material.

According to another aspect of the invention there is provided an apparatus for threading a wire through a hollow upright pole, the apparatus comprising:
 a threading device as defined above,
 a length of a line to be threaded,
 a weight, and
 at least one threading rod for coupling to the securing means of the device.

The weight can be provided with attachment means attachable to one end of the line.

The attachment means can be a snap hook.

The line can be provided with respective fastening means at each end for enabling one end of the line to be attached to the other end of the line to form a closed loop thereby to enable a plurality of wires to be threaded through a pole. One of the fastening means can be a snap hook.

According to another aspect of the invention there is provided a method of threading a line through a hollow upright pole, comprising the steps of
 passing one end of the line through a guiding and supporting means on a shaft hinged to a threading rod,
 providing a weight at the end of the line,
 holding the line to prevent it passing through the guiding and supporting means under the influence of the weight,
 passing the guiding and supporting means, the weight and the line through the inside of the hollow pole to be threaded by means of the threading rod,
 allowing the guiding and supporting means and the shaft to pivot relative to the threading rod to permit the weight to hang beside the pole,
 lowering the weight by paying out the line to permit the line to be secured outside the hollow pole, and
 withdrawing the threading rod, guide means and shaft.

The threading device is fastened to a flexible threading rod to pass the device upwards through the hollow pole and further rods can be fastened in series to increase the total rod length until the device reaches the top of the pole.

The method can further include the step of rotating the threading rod, before lowering the weight by paying out the line, to locate the weight and consequently the line in a desired orientation relative to the pole.

The method can further include the steps of removing the weight from the end of the line, after lowering the weight by paying out the line, and securing a wire to be drawn into the pole to the line.

The method can further include the step of pulling the line to draw the wire into the pole after securing the wire to the line.

The method can further include the steps of removing the weight from the end of the line, after lowering the weight by paying out the line, securing the end of the line to which the weight was attached to the other end of the line, whereby the line forms an endless loop, successively securing to the line a plurality of wires to be drawn into the pole and drawing them into the pole.

The step of providing a weight at one end of the line can comprise the steps of providing a weight secured to a snap hook and fastening the snap hook to the end of the line.

The step of passing one end of the line through a guiding and supporting means on a shaft hinged to a threading rod, can comprise looping the end of the line over a part of the guiding and supporting means or alternatively it can comprise threading the end of the line through the guiding and supporting means.

If desired, before the threading rod, guide means and shaft have been withdrawn from the top of the pole, the wire can be pulled through the guide means and down the pole providing the wire can pass through the guide means. Alternatively the wire could be attached to the end of the line remote from the weight and pulled upwards inside the pole.

In order that the invention may be fully understood and readily carried into effect it will now be described with reference to the accompanying drawings, of which:

FIG. 1 is a side view of an embodiment of the invention;

FIG. 2 is a fragmentary sectional view along the lines II shown in FIG. 1 of the embodiment of FIG. 1;

FIG. 3 is a view in the direction of the arrow III shown in FIG. 1;

Figures 4, 5, 6:
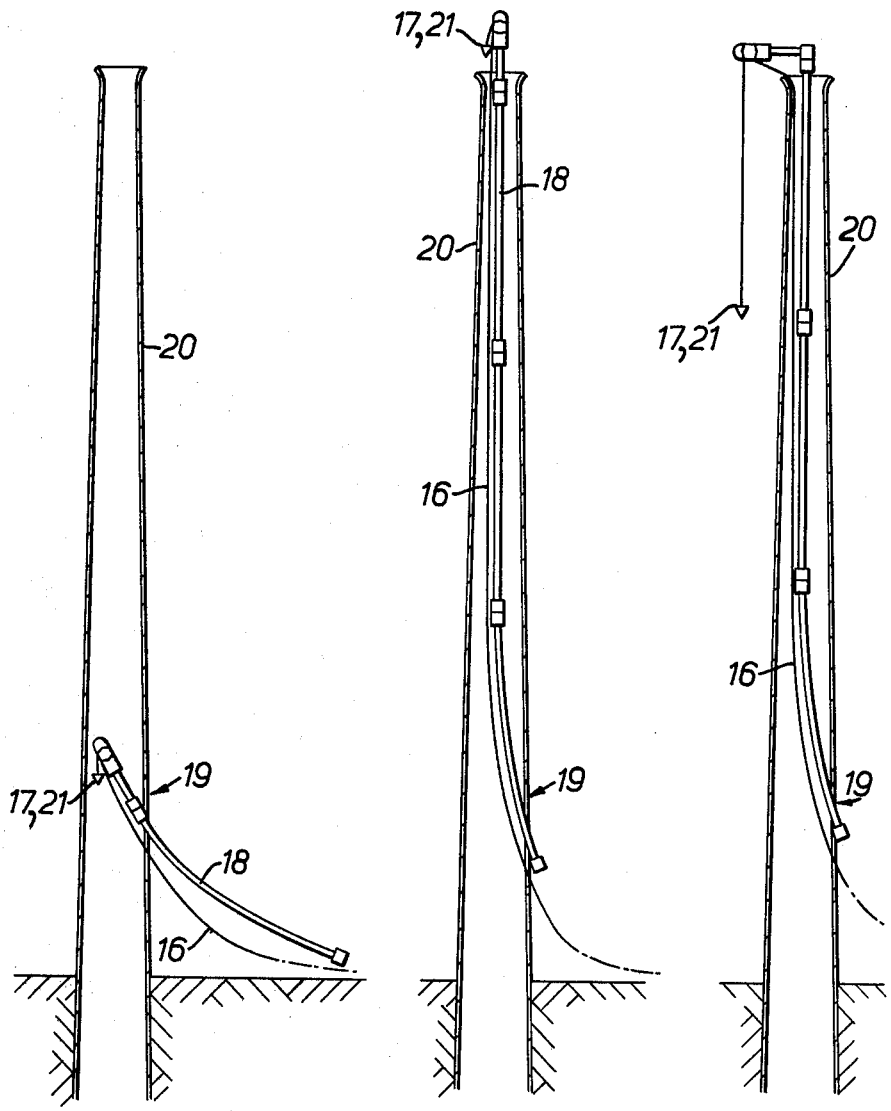
FIGS. 4 and 6 illustrate schematically progressive steps of a method embodying the invention.

The threading device shown diagramatically in FIGS. 1, 2 and 3 has an elongate block 1, fixed to a shaft 2 which in turn is pivotally connected to a female coupling 3 for receiving a threading rod.

The block 1 is generally cylindrical with a rounded end, moulded in plastic material and provided with passageways. A passageway 6 defines the outline of a bollard 5 having a head 7 extending to the outer surface of the block. Passageways 8 and 9 are also provided in the block running generally longitudinally to feed a line round the bollard; thus the passageways 8 and 9 communicate with the passageway 6. The passageway 8 extends towards the end of the block fixed to the shaft 2 and the passageway 9 extends towards the other, rounded end. As shown by dotted lines 10 in FIG. 1, the surfaces of these passageways are smoothly curved so that a line can pass freely through the passageways round the bollard 5.

The shaft 2 which is of rectangular section and made of aluminium is inset at one end into the end of the block 1 so as to be substantially collinear with it and secured by a pin 11. The other end of the shaft is pivotally connected by a pin 12 to the female coupling 3. For this purpose the coupling 3 is provided at one end with two upstanding portions 13 which extend on either side of the shaft 2 and through which the pin 12 passes. The arrangement of the pivotal mounting is such that the coupling 3 can rotate through approximately a right angle relative to the shaft 2 to a position 14 shown by dotted lines in FIG. 1. The other end of the coupling 3 is provided with a screw thread 15 for receiving the end of a flexible threading rod or pole.

FIGS. 4 to 6 illustrate a way of using the device of FIGS. 1, 2 and 3. Referring first to FIG. 4, a snap hook 21 from which a weight 17 hangs, is fastened to a sash line 16 which is looped over the head 7 and around the bollard 5 with the weighted end passing out through passageway 9 and the other end through passageway 8. The line 16 is shown in position on the block 1 in FIG. 7. A male screw threaded end of a flexible rod 18 is then screwed into the threaded part 15 of the coupling 3 and the arrangement pushed through an aperture 19 in a hollow upright telegraph pole 20 fixed in the ground, with the threading device at the top. While the threading device is in the pole it is retained in an almost vertical position by the inner walls of the pole. In this position within the pole the snap hook 21 and the weight 17 present a streamlined nose and thus do not snag on obstructions inside the pole. Further flexible rods are added to the flexible rod 18 as it passes up the pole 20 in a well known manner. While raising the threading device towards the top of the pole the sash line 16 is maintained taut so that the weight 17 remains adjacent the device.

When the block and shaft of the threading device clear the top of the pole (FIG. 5) they fall to the position 14 (FIG. 6) disposed more or less at right angles to the rod 18 with the weight 17 hanging down freely in the passageway 9 outside the telegraph pole 20. This position is shown most clearly in FIG. 7. The lowermost flexible rod is now rotated by the operator to position the weight in the required radial position. The tension is then released from the sash line and the weight lowered (FIG. 6) between any wires which may have been previously attached to the top of the pole, until the weight reaches the ground. The rotational adjustment by the operator enables the sash line to be lowered between any two selected wires. Also the smooth contouring of the passageways 8 and 9 and the bollard 5 ensures that the sash line runs freely through the threading device.

Figure 7:
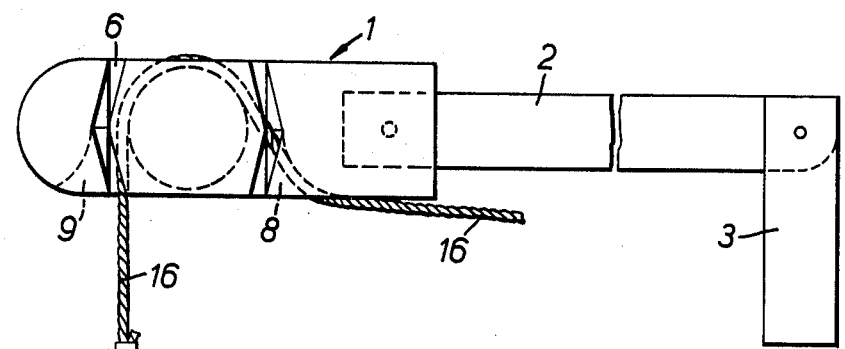
FIG. 7 is a side view of the embodiment of FIG. 1 being used in the method.
Figure 8:
FIG. 8 is a side view of another part of apparatus used in the method.

When the weighted sash line reaches the ground the operator secures the weighted end of the line and lowers the rods and threading device back down inside the pole disconnecting the rods as appropriate. When the threading device has been retrieved the operator unloops the line from around the bollard 5 bringing the line out through the passageway 6. The snap hook 21 can be unfastened from the end of line 16 and this end of the line 16 fastened to a wire to be drawn into the pole. The wire can then be pulled over the pole head and down inside the pole and secured at the bottom of the pole as required. Alternatively this end of the line 16 can be fastened to another smaller snap hook 22 which is shown in FIG. 7 and which is attached to the other end of the line 16: in this case the line 16 forms an endless loop which can be used to draw a plurality of wires into the pole successively.

Figure 9:
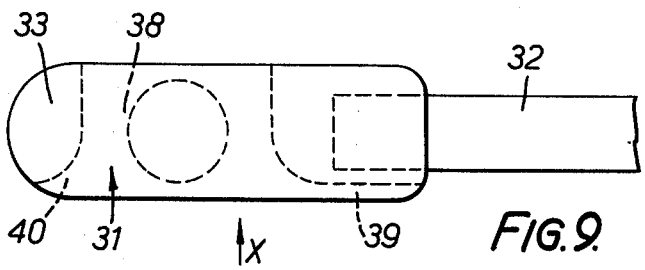
FIG. 9 is a side view of part of another embodiment of the invention similar to the embodiment of FIG. 1.
Figure 10:
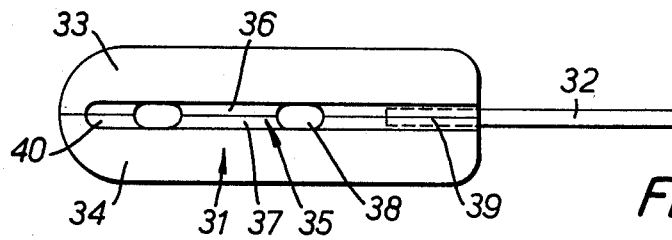
FIG. 10 is a view in the direction of the arrow X shown in FIG. 9.

FIGS. 9 and 10 show the head of another threading device similar to the device shown in FIGS. 1, 2 and 3. This device comprises a block 31 fixed to an aluminium shaft 32 which is of the same construction as the shaft 2 and is connected to the same female coupling 3 (not shown in FIGS. 9 and 10) as the block 1. The arrangement of the shaft and female coupling is the same as that shown in FIGS. 1 and 3.

The block 31 which is generally cylindrical with a rounded end is made up of a pair of mouldings 33 and 34 of plastics material. The mouldings 33 and 34 are joined to each other and to the shaft 32 to make up the block 31. As can be seen most clearly in FIG. 10, a bollard 35 (equivalent to the bollard 5 in FIG. 3) is formed in the middle of the block 31 by a boss 36 extending from the moulding 33 and a similar boss 37 extending from the moulding 34; the passageway 6 of the block 1 is not provided in the block 31. Around the bollard 35 a ring like passageway 38 is formed. A passageway 39, which is an extension of the passageway 38, extends towards the shaft 32 and a passageway 40, which is another extension of the passageway 38, extends toward the rounded end of the block 31. The surfaces defining these passageways are smoothly curves so that a line can pass freely through the passageways round the bollard 35.

It will be clear from the description above that in this embodiment the sash line 16 cannot be looped over the bollard 35 but rather must be threaded through the passageway 38 around the bollard 35. Thus in operation of the device shown in FIGS. 9 and 10, the end of the sash line to be attached to the weight 17 is first threaded through the passageway 38 around the bollard 35 such that the end of the line passes out through the passageway 40. The snap hook 21 from which the weight 17 hangs is then fastened to the end of the line 16. The threading device together with the weight 17 can then be raised to the top of a hollow telegraph pole, the weight lowered down the outside of the pole and the threading device lowered back down the inside of the pole in the same manner as previously described with reference to FIGS. 4 to 6.

Once the threading device of FIGS. 9 and 10 has been retrieved from the telegraph pole, the sash line cannot be unlooped from the bollard as can the device of FIGS. 1 to 3. Instead the operator grips the sash line 16 between the aperture 19 of the telegraph pole and the block 31; he then pulls the line such that the end of the line which has not been threaded up the pole is drawn through the passageway 40 in the block 31. In this respect it should be noted that the snap hook 22 is small enough to pass round the bollard 35 through the passageway 40.

After this operation the sash line 16 is arranged in the same position as after being threaded by the device of FIGS. 1 to 3. Thus as before, the snap hook 21 can be unfastened from the end of the line 16 and a wire to be drawn into the pole can be fastened to this end of the line or this end of the line can be fastened to the snap hook 22 at the other end of the line 16 to form an endless loop.

The device of FIGS. 9 and 10 is particularly economical to manufacture since the block 31 is moulded as a pair of plastics mouldings, one left hand and one right hand.

It should be noted that the arrangement of passageways in both the device of FIGS. 1 to 3 and that of FIGS. 9 and 10 is asymmetrical about the plane in which the axis of the shaft and the axis of hinging lie so that it is obvious to an operator on which side of the block the ends of the line should pass out of the block. The shafts 2 and 32 are each pivotally mounted on their respective female couplings 3 for rotation from their axially aligned position through a right angle in one direction only. Thus when the block and shaft clear the top of a pole during a threading operation the block and shaft can fall in only one direction (that which the pivotal mounting allows) and, once the block and shaft have so fallen, the free end of the line being threaded will pass out of the block at the bottom of the block, i.e., as shown in FIG. 7.

While threading devices and methods of threading have been described with reference to the threading of a telegraph pole it would be possible to use the device and method to thread any other upright tubular pole, such as is used for example for a street lamp or road sign.

What I claim is:

1. A threading device for threading a wire through a hollow upright pole, the device including a guiding and supporting means for guiding and supporting a line and a substantially rigid shaft on an end of which the guiding and supporting means is mounted, the other end of the shaft being hinged to means capable of securing the shaft to a threading rod.

2. A threading device as claimed in claim 1 in which the end of the guiding and supporting means furthest from said other end of the shaft has a smoothly rounded surface.

3. A threading device as claimed in claim 2 in which the guiding and supporting means is of elongate shape and mounted on the shaft with its long axis substantially collinear with the shaft.

4. A threading device as claimed in claim 1 in which the guiding and supporting means comprises a block provided with passageways and having a body part and a bollard housed in a recess within the block and surrounded by passageways.

5. A threading device as claimed in claim 4 in which the bollard is integrally formed with the block.

6. A threading device as claimed in claim 5 in which the bollard is freely upstanding in said recess.

7. A threading device as claimed in claim 6 in which the upstanding end of the bollard is flared to define retaining means for retaining a line around the bollard.

8. A threading device as claimed in claim 5 in which the opposite ends of the bollard are attached to respective regions of the body part.

9. A threading device as claimed in claim 8 in which the body part is formed with a slot passing through the body transverse to the shaft and the bollard bridges the slot.

10. A threading device as claimed in claim 1 in which the hinging of the shaft to the securing means is such that the shaft can pivot about the securing means from a position in line with a threading rod to which the device is secured through approximately a right angle to one side only.

11. A threading device as claim in claim 1 in which the guiding and supporting means are asymmetrical about the plane in which the axis of the shaft and the axis of hinging lie.

12. A threading device as claimed in claim 1 in which the guiding and supporting means is made of a material selected from the group of metal, wood and plastics material.

13. An apparatus for threading a wire through a hollow upright pole, the apparatus comprising:
    a length of line;
    at least one threading rod;
    a threading device including a guiding and supporting means for guiding and supporting the line and a substantially rigid shaft on an end of which the guiding and supporting means is mounted, the other end of the shaft being provided with hinge means securing it to means for securing the shaft to one of said at least one threading rod; and
    a weight attached to an end of said line.

14. An apparatus as claimed in claim 13 in which the weight is provided with attachment means attachable to one end of the line.

15. An apparatus as claimed in claim 14 in which the attachment means is a snap hook.

16. An apparatus as claimed in claim 13 in which the line is provided with respective fastening means at each end for enabling one end of the line to be attached to the other end of the line to form a closed loop thereby to enable a plurality of wires to be threaded through a pole.

17. An apparatus as claimed in claim 16 in which one of the fastening means is a snap hook.

18. A method of threading a line through a hollow upright pole, comprising the steps of passing one end of the line through a guiding and supporting means on a shaft hinged to a threading rod, providing a weight at the end of the line, holding the line to prevent it passing through the guiding and supporting means under the influence of the weight, passing the guiding and supporting means, the weight and the line through the inside of the hollow pole to be threaded by means of the threading rod, allowing the guiding and supporting means and the shaft to pivot relative to the threading rod to permit the weight to hang beside the pole, lowering the weight by paying out the line to permit the line to be secured outside the hollow pole, and withdrawing the threading rod, guide means and shaft.

19. A method as claimed in claim 18 in which the threading device is fastened to a flexible threading rod to pass the device upwards through the hollow pole and further rods are fastened in series to increase the total rod length until the device reaches the top of the pole.

20. A method as claimed in claim 19 further including the step of rotating the threading rod, before lowering the weight by paying out the line, to locate the weight and consequently the line in a desired orientation relative to the pole.

21. A method as claimed in claim 20 further including the steps of removing the weight from the end of the line, after lowering the weight by paying out the line, and securing a wire to be drawn into the pole to the line.

22. A method as claimed in claim 21 further including the step of pulling the line to draw the wire into the pole after securing the wire to the line.

23. A method as claimed in claim 20 further including the steps of removing the weight from the end of the line, after lowering the weight by paying out the line, securing the end of the line to which the weight was attached to the other end of the line whereby the line forms an endless loop, successively securing to the line a plurality of wires to be drawn into the pole and drawing them into the pole.

24. A method as claimed in claim 18 in which the step of providing a weight at one end of the line comprises the steps of providing a weight secured to a snap hook and fastening the snap hook to the end of the line.

25. A method as claimed in claim 18 in which the step of passing one end of the line through a guiding and supporting means on a shaft hinged to a threading rod, comprises looping the end of the line over a part of the guiding and supporting means.

26. A method as claimed in claim 18 in which the step of passing one end of the line through a guiding and supporting means on a shaft hinged to a threading rod, comprises threading the end of the line through the guiding and supporting means.

* * * * *